(12) United States Patent
Pesonen

(10) Patent No.: US 10,499,033 B2
(45) Date of Patent: Dec. 3, 2019

(54) APPARATUS, A METHOD AND A COMPUTER PROGRAM FOR CODING AND RENDERING VOLUMETRIC VIDEO

(71) Applicant: Nokia Technologies Oy, Espoo (FI)

(72) Inventor: Mika Pesonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/140,886

(22) Filed: Sep. 25, 2018

(65) Prior Publication Data

US 2019/0116352 A1 Apr. 18, 2019

(30) Foreign Application Priority Data

Oct. 13, 2017 (GB) .................................. 1716768.5

(51) Int. Cl.
*H04N 13/00* (2018.01)
*G06T 7/60* (2017.01)
(Continued)

(52) U.S. Cl.
CPC ......... *H04N 13/161* (2018.05); *G06K 9/6267* (2013.01); *G06T 7/50* (2017.01); *G06T 15/08* (2013.01); *H04N 13/128* (2018.05); *H04N 13/15* (2018.05); *H04N 13/194* (2018.05); *H04N 13/271* (2018.05); *H04N 13/344* (2018.05); *H04N 19/00* (2013.01); *G06T 17/005* (2013.01); *G06T 17/20* (2013.01); *G06T 2207/10021* (2013.01); *G06T 2207/10028* (2013.01); *G06T 2207/20021* (2013.01); *H04N 2013/0081* (2013.01)

(58) Field of Classification Search
CPC .. H04N 13/363; H04N 13/128; H04N 13/388; G06T 7/50; G06K 9/6267

USPC .......................................................... 348/47
See application file for complete search history.

(56) References Cited

U.S. PATENT DOCUMENTS

| 9,736,455 B2 | 8/2017 | Georgiev et al. |
| 2004/0125103 A1* | 7/2004 | Kaufman ................ G06T 15/06 345/419 |

(Continued)

FOREIGN PATENT DOCUMENTS

WO 2016/185079 A1 11/2016

OTHER PUBLICATIONS

Finnish Application No. 20175893, "An Apparatus, a Method and a Computer Program for Volumetric Video", filed on Oct. 11, 2017, pp. 1-44.

(Continued)

*Primary Examiner* — Jeffery A Williams
(74) *Attorney, Agent, or Firm* — Nokia Technologies Oy

(57) ABSTRACT

In some embodiments depth information of a frame of volumetric video is obtained. The depth information is examined in a block-wise manner, wherein each block comprises two or more depth values. A classification indication of a block is provided in a block offset table. Said classification indication is a partially full block, if the examination reveals that at least one depth value of the block is different from a maximum depth value, and at least one other depth value of the block is equal to the maximum depth value;

forming a block mask for the partially full block. A mask value in the block mask is provided for each depth value of the block, said mask value indicating whether the depth value is equal to the maximum depth value or different from the maximum depth value. An index to the block mask is provided in the block offset table.

26 Claims, 9 Drawing Sheets

(51) Int. Cl.
*G06K 9/62* (2006.01)
*H04N 13/161* (2018.01)
*G06T 7/50* (2017.01)
*G06T 15/08* (2011.01)
*H04N 13/128* (2018.01)
*H04N 13/15* (2018.01)
*H04N 13/194* (2018.01)
*H04N 19/00* (2014.01)
*H04N 13/344* (2018.01)
*H04N 13/271* (2018.01)
*G06T 17/20* (2006.01)
*G06T 17/00* (2006.01)

(56) References Cited

U.S. PATENT DOCUMENTS

2014/0267603 A1 9/2014 Kerdok et al.
2015/0049821 A1 2/2015 Chen et al.
2015/0187125 A1 7/2015 Hasselgren et al.

OTHER PUBLICATIONS

GB Application No. 1717011.9, "An Apparatus, a Method and a Computer Program for Volumetric Video", filed on Oct. 17, 2017, pp. 1-46.

U.S. Appl. No. 62/586,292, "An Apparatus, a Method and a Computer Program for Volumetric Video", filed Nov. 15, 2017, pp. 1-61.

GB Application No. 1717012.7, "An Apparatus, a Method and a Computer Program for Coding Volumetric Video", filed on Oct. 17, 2017, pp. 1-36.

Finnish Application No. 20175730, "Encoding and Decoding of Volumetric Video", filed on Aug. 15, 2017, pp. 1-42.

Finnish Application No. 20175731, "Sequential Encoding and Decoding of Volumetric Video", filed on Aug. 15, 2017, pp. 1-62.

Hu et al., "Depth Map Compression Using Multi-resolution Graph-based Transform for Depth-image-based Rendering", IEEE International Conference on Image Processing, Sep. 30-Oct. 3, 2012, pp. 1297-1300.

Wu et al., "Color-Plus-Depth Level-of-Detail in 3D Tele-immersive Video: a Psychophysical Approach", Proceedings of the 19th ACM international conference on Multimedia, Nov. 28-Dec. 1, 2011, pp. 13-22.

Yang et al., "Real-time 3D Video Compression for Tele-immersive Environments", Multimedia Computing and Networking, vol. 6071, 2006, 15 pages.

Search Report received for corresponding United Kingdom Patent Application No. 1716768.5, dated Apr. 10, 2018, 4 pages.

\* cited by examiner

APPARATUS, A METHOD AND A COMPUTER PROGRAM FOR CODING AND RENDERING VOLUMETRIC VIDEO

TECHNICAL FIELD

The present invention relates to an apparatus, a method and a computer program for encoding, decoding and rendering volumetric video content.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Volumetric video data represents a three-dimensional scene or object and can be used as input for virtual reality (VR), augmented reality (AR) and mixed reality (MR) applications. Such data describes the geometry, e.g. shape, size, position in three-dimensional (3D) space, and respective attributes, e.g. color, opacity, reflectance and any possible temporal changes of the geometry and attributes at given time instances, comparable to frames in two-dimensional (2D) video. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point clouds (PCs), or voxel arrays. Temporal information about the scene can be included in the form of individual capture instances, i.e. "frames" in 2D video, or other means, e.g. position of an object as a function of time.

Delivering and rendering detailed volumetric content on mobile devices can be challenging for augmented reality and virtual reality applications. Especially in augmented reality applications processing power of a processing unit (CPU) and/or a graphics processing unit (GPU) of a rendering device is spend on doing real-time image processing operations in order to determine viewing direction and position. Due to this reason there may be less processing power available for actual rendering of the augmented reality content.

Typical augmented reality content is a virtual character displayed on a display overlaid to the camera viewfinder image. Using low resolution/low complex content may not be appealing to the end-user and high quality AR content is desirable. Due to the limited CPU/GPU budget it may be difficult to create such AR content.

A problem with compressed color+depth video encoding is the quality of the encoded content. Depth encoding may play important role as it may produce highly visible unwanted visual artefacts during the playback phase. As an example, if a depth video is encoded so that a maximum depth value is used to determine if the depth value should be rendered or not, then if any depth max depth value changes its value during encoding/decoding, visible artefacts will appear during the rendering. An example of this is illustrated in FIG. 5 where the black points 502 illustrate some examples of the maximum depth value which does not represent a correct maximum depth value after video encoding but some other value less than the maximum depth value. If 8 bits are used in encoding the maximum depth value, the value of the point 502 should be 255 but due to erroneous behavior the value is less than 255. This causes that this point is rendered as a visible depth sample.

SUMMARY

Some embodiments provide a method for encoding and decoding video information. In some embodiments of the present invention there is provided a method, apparatus and computer program product for volumetric video coding, decoding as well as rendering.

Various aspects of examples of the invention are provided in the detailed description.

According to a first aspect, there is provided a method comprising:

obtaining depth information of a frame of volumetric video;

examining the depth information in a block-wise manner, wherein each block comprises two or more depth values;

providing a classification indication of a block in a block offset table, said classification indication being a partially full block, if the examination reveals that at least one depth value of the block is different from a maximum depth value, and at least one other depth value of the block is equal to the maximum depth value;

forming a block mask for the partially full block;

providing a mask value in the block mask for each depth value of the block, said mask value indicating whether the depth value is equal to the maximum depth value or different from the maximum depth value; and providing an index to the block mask in the block offset table.

An apparatus according to a second aspect comprises at least one processor and at least one memory, said at least one memory stored with code thereon, which when executed by said at least one processor, causes the apparatus to perform at least:

obtain depth information of a frame of volumetric video;

examine the depth information in a block-wise manner, wherein each block comprises two or more depth values;

provide a classification indication of a block in a block offset table, said classification indication being a partially full block, if the examination reveals that at least one depth value of the block is different from a maximum depth value, and at least one other depth value of the block is equal to the maximum depth value;

form a block mask for the partially full block;

provide a mask value in the block mask for each depth value of the block, said mask value indicating whether the depth value is equal to the maximum depth value or different from the maximum depth value; and provide an index to the block mask in the block offset table.

A computer readable storage medium according to a third aspect comprises code for use by an apparatus, which when executed by a processor, causes the apparatus to perform:

obtain depth information of a frame of volumetric video;

examine the depth information in a block-wise manner, wherein each block comprises two or more depth values;

provide a classification indication of a block in a block offset table, said classification indication being a partially full block, if the examination reveals that at least one depth value of the block is different from a maximum depth value, and at least one other depth value of the block is equal to the maximum depth value;

form a block mask for the partially full block;

provide a mask value in the block mask for each depth value of the block, said mask value indicating whether the depth value is equal to the maximum depth value or different from the maximum depth value; and provide an index to the block mask in the block offset table.

An apparatus according to a fourth aspect comprises:

means for obtaining depth information of a frame of volumetric video;

means for examining the depth information in a block-wise manner, wherein each block comprises two or more depth values;

means for providing a classification indication of a block in a block offset table, said classification indication being a partially full block, if the examination reveals that at least one depth value of the block is different from a maximum depth value, and at least one other depth value of the block is equal to the maximum depth value;

means for forming a block mask for the partially full block;

means for providing a mask value in the block mask for each depth value of the block, said mask value indicating whether the depth value is equal to the maximum depth value or different from the maximum depth value; and means for providing an index to the block mask in the block offset table.

Further aspects include at least apparatuses and computer program products/code stored on a non-transitory memory medium arranged to carry out the above methods.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 1:
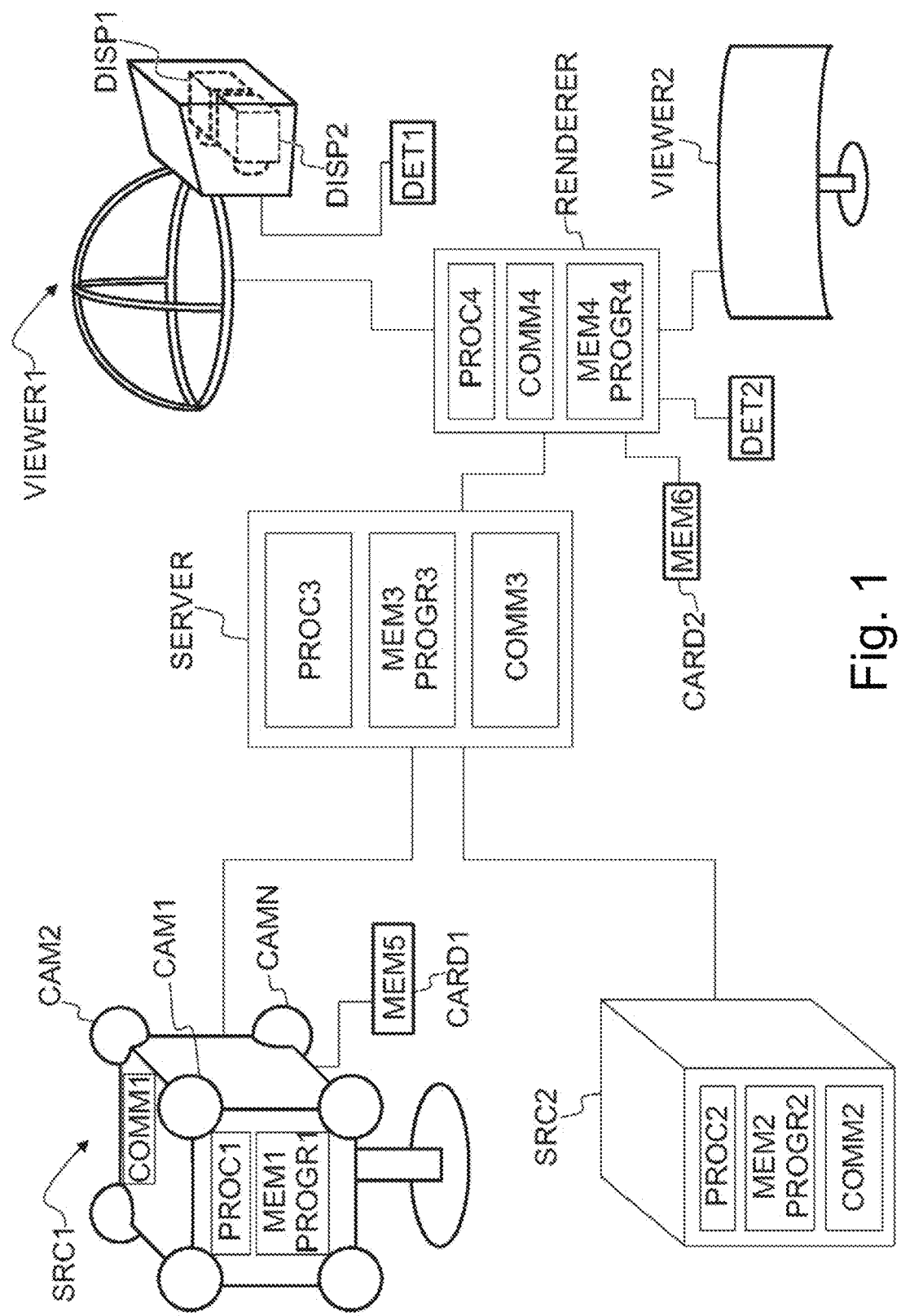
FIG. 1 shows a system according to an embodiment.

In the following, several embodiments of the invention will be described in the context of one volumetric video coding arrangement. It is to be noted, however, that the invention is not limited to this particular arrangement. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

"Voxel" of a three-dimensional world corresponds to a pixel of a two-dimensional world. Voxels exist in a three-dimensional grid layout. An octree is a tree data structure used to partition a three-dimensional space. Octrees are the three-dimensional analogue of quadtrees. A sparse voxel octree (SVO) describes a volume of a space containing a set of solid voxels of varying sizes. Empty areas within the volume are absent from the tree, which is why it is called "sparse".

A three-dimensional volumetric representation of a scene is determined as a plurality of voxels on the basis of input streams of at least one multicamera device. Thus, at least one but preferably a plurality (i.e. 2, 3, 4, 5 or more) of multicamera devices are used to capture 3D video representation of a scene. The multicamera devices are distributed in different locations in respect to the scene, and therefore each multicamera device captures a different 3D video representation of the scene. The 3D video representations captured by each multicamera device may be used as input streams for creating a 3D volumetric representation of the scene, said 3D volumetric representation comprising a plurality of voxels. Voxels may be formed from the captured 3D points e.g. by merging the 3D points into voxels comprising a plurality of 3D points such that for a selected 3D point, all neighboring 3D points within a predefined threshold from the selected 3D point are merged into a voxel without exceeding a maximum number of 3D points in a voxel.

Point clouds are commonly used data structures for storing volumetric content. Point clouds describe an unorganized set of separate points limited only by the precision of the used coordinate values. In a point cloud based scene model or object model, points may be represented with any floating point coordinates. A quantized point cloud may be used to reduce the amount of data, whereby the coordinate values of the point cloud are represented e.g. with 10-bit, 12-bit or 16-bit integers. Integers may be used because hardware accelerators may be able to operate on integers more efficiently. The points in the point cloud may have associated color, reflectance, opacity and/or other texture values. The points in the point cloud may also have a size, or a size may be the same for all points. The size of the points may be understood as indicating how large an object the point appears to be in the model in the projection. The point cloud may be projected by ray casting from the projection surface to find out the pixel values of the projection surface. In such a manner, the topmost point remains visible in the projection, while points closer to the center of the projection surface may be occluded.

Voxel coordinates uniquely identify an individual node or solid voxel within the octree. The coordinates are not stored in the SVO itself but instead describe the location and size of the node/voxel. The coordinates have four integer components: level, X, Y, and Z. The level component specifies the subdivision level (level zero being the root node), which each subsequent level subdividing the node in eight equal-sized segments along the X, Y, and Z axes. For example, level 1 comprises eight nodes and level 2 has 64 (=8×8) nodes.

When encoding a volumetric video, each frame may produce several hundred megabytes or several gigabytes of voxel data which needs to be converted to a format that can be streamed to the viewer, and rendered in real-time. The amount of data depends on the world complexity and the number of cameras. The larger impact comes in a multi-device recording setup with a number of separate locations where the cameras are recording. Such a setup produces more information than a camera at a single location.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense Voxel arrays have been used to represent volumetric medical data. In 3D graphics polygonal meshes are extensively used. Point clouds on the other hand are well suited for applications such as capturing real world 3D scenes where the topology is not necessarily a 2D manifold. Another way to represent 3D data is to code it as a set of texture and depth maps, as is the case in the multi-view plus depth. Closely related to the techniques used in multi-view plus depth is the use of elevation maps, and multi-level surface maps.

In the cases of dense point clouds or voxel arrays, the reconstructed 3D scene may contain tens or even hundreds of millions of points. If such representations are to be stored or interchanged between endpoints, then efficient compression may become important.

The present embodiments relate to virtual reality (VR). In particular, the present embodiments relate to streaming of three-dimensional (3D) virtual reality video for six degrees of freedom (6 DoF) viewing.

Volumetric video may be captured using one or more cameras. Volumetric video is to virtual reality what traditional video is to 2D/3D displays. When multiple cameras are in use, the captured footage is synchronized so that the cameras provide different viewpoints to the same world. In contrast to traditional 2D/3D video, volumetric video describes a 3D model of the world where the viewer is free to move and observe different parts of the world.

The present embodiments are discussed in relation to media content captured with more than one camera devices.

FIG. 1 shows a system and apparatuses for stereo viewing, that is, for 3D video and 3D audio digital capture and playback. The task of the system is that of capturing sufficient visual and auditory information from a specific location such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video source SRC1 comprises multiple cameras CAM1, CAM2, . . . , CAMN with overlapping field of view so that regions of the view around the video capture device is captured from at least two cameras. The video source SRC1 may comprise multiple microphones to capture the timing and phase differences of audio originating from different directions. The video source SRC1 may comprise a high resolution orientation sensor so that the orientation (direction of view) of the plurality of cameras CAM1, CAM2, . . . , CAMN can be detected and recorded. The video source SRC1 comprises or is functionally connected to, or each of the plurality of cameras CAM1, CAM2, . . . , CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system.

Alternatively or in addition to the source device SRC1 creating an image stream, or a plurality of such, one or more sources SRC2 of synthetic images may be present in the system. Such sources of synthetic images may use a computer model of a virtual world to compute the various image streams it transmits. For example, the source SRC2 may compute N video streams corresponding to N virtual cameras located at a virtual viewing position. When such a synthetic set of video streams is used for viewing, the viewer may see a three-dimensional virtual world. The device SRC2 comprises or is functionally connected to a computer processor PROC2 and memory MEM2, the memory comprising computer program PROGR2 code for controlling the synthetic source device SRC2. The image stream captured by the device may be stored on a memory device MEM5 for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or computation device SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream from a server and for decoding the video data stream. The data stream may be received over a network connection through communications interface COMM4, or from a memory device MEM6 like a memory card CARD2. The viewer devices may have a graphics processing unit for processing of the data to a suitable format for viewing. The viewer VIEWER1 comprises a high-resolution stereo-image head-mounted display for viewing the rendered stereo video sequence. The head-mounted display may have an orientation sensor DET1 and stereo audio headphones. According to an embodiment, the viewer VIEWER2 comprises a display enabled with 3D technology (for displaying stereo video), and the rendering device may have a head-orientation detector DET2 connected to it. Alternatively, the viewer VIEWER2 may comprise a 2D display, since the volumetric video rendering can be done in 2D by rendering the viewpoint from a single eye instead of a stereo eye pair. Any of the devices (SRC1, SRC2, SERVER, RENDERER, VIEWER1, VIEWER2) may be a computer or a portable computing device, or be connected to such. Such rendering devices may have computer program code for carrying out methods according to various examples described in this text.

Figure 2A:
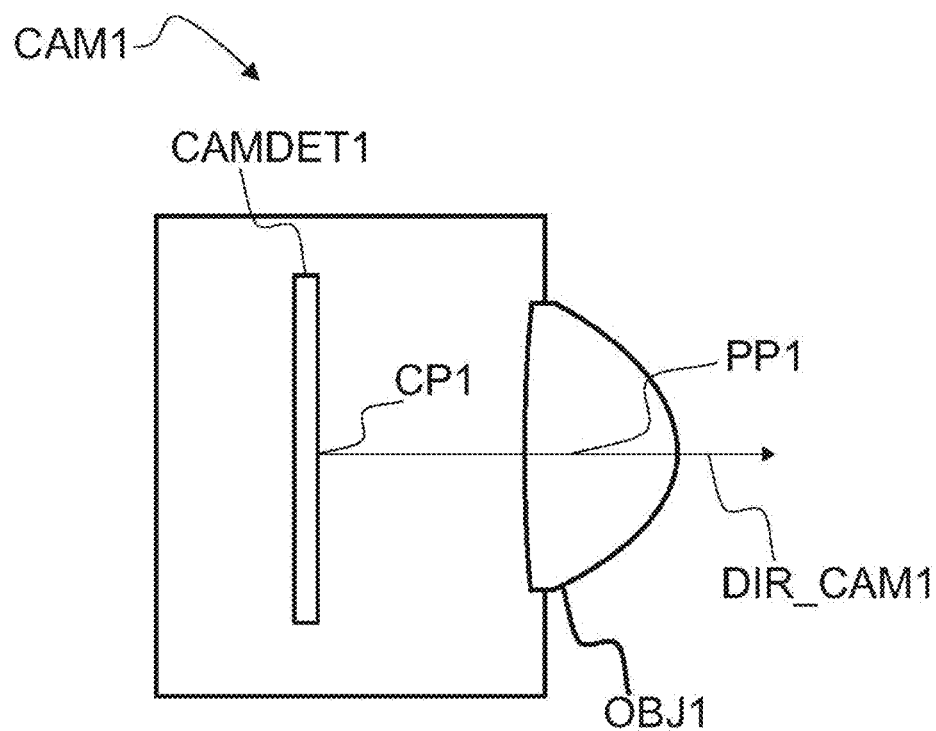
FIG. 2a shows a camera device according to an embodiment.

FIG. 2a illustrates a camera CAM1. The camera has a camera detector CAMDET1, comprising a plurality of sensor elements for sensing intensity of light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality of sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

Figure 2B:
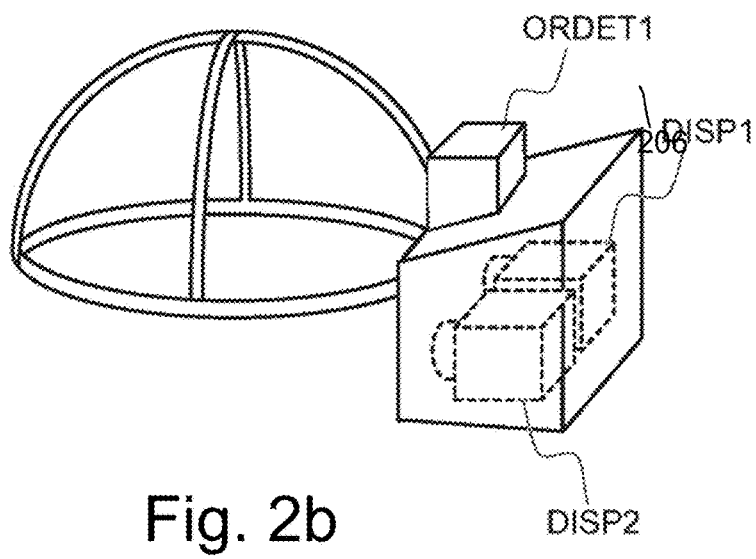
FIG. 2b shows a display device according to an embodiment.

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

The system described above may function as follows. Time-synchronized video, audio and orientation data is first recorded with the capture device. This can consist of multiple concurrent video and audio streams as described above. These are then transmitted immediately or later to the storage and processing network for processing and conversion into a format suitable for subsequent delivery to playback devices. The conversion can involve post-processing steps to the audio and video data in order to improve the quality and/or reduce the quantity of the data while preserving the quality at a desired level. Finally, each playback device receives a stream of the data from the network and renders it into a stereo viewing reproduction of the original location which can be experienced by a user with, for example, the head-mounted display and headphones.

Figure 3:
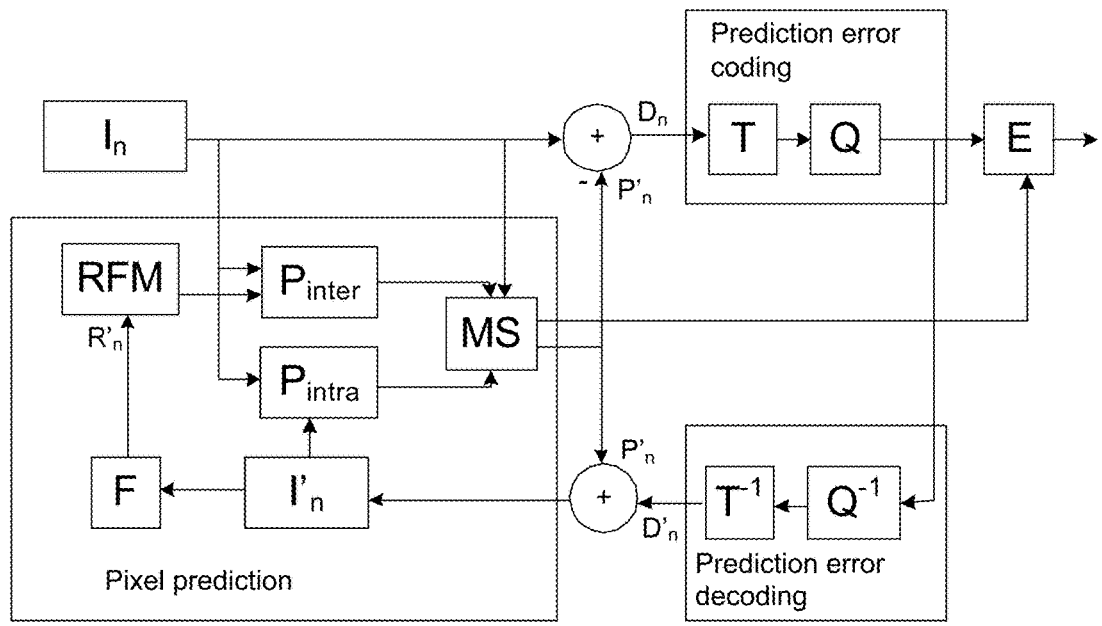
FIG. 3 shows an encoding process according to an embodiment.
Figure 4:
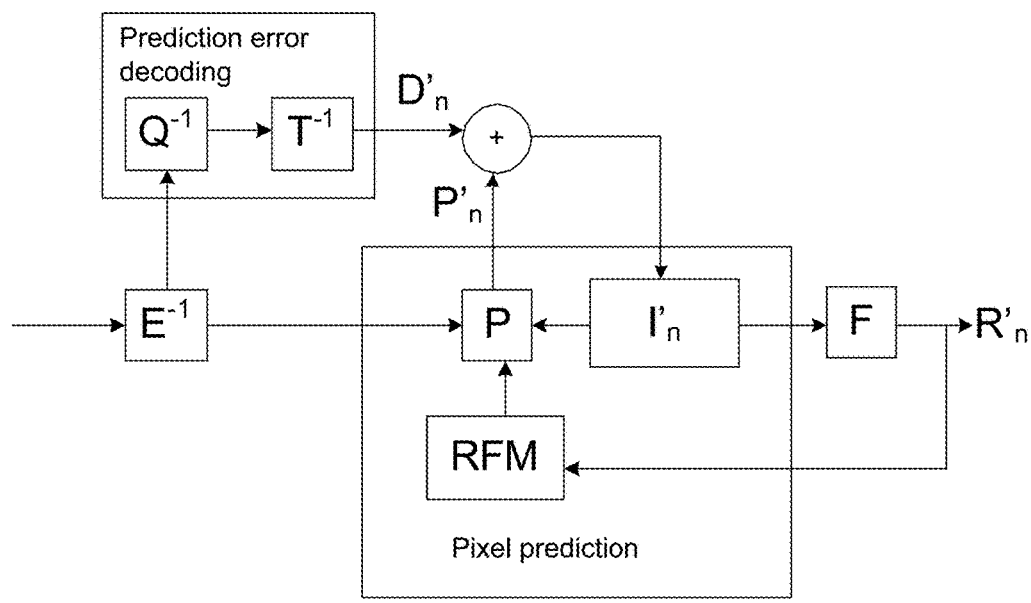
FIG. 4 shows a decoding process according to an embodiment.
Figure 5:
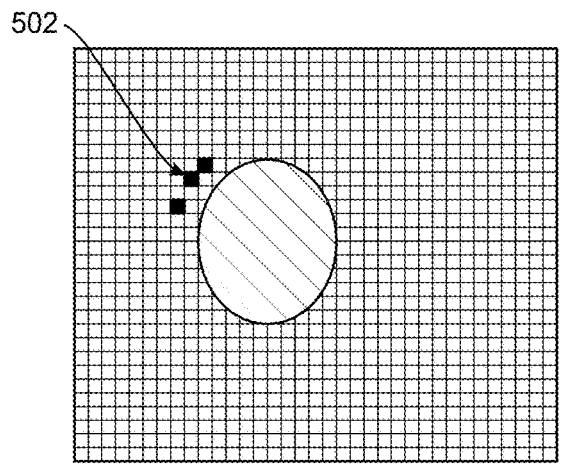
FIG. 5 illustrates an example of visible artefacts which may appear during rendering of volumetric video.

A video codec consists of an encoder that transforms an input video into a compressed representation suited for storage/transmission and a decoder that can uncompress the compressed video representation back into a viewable form. Typically, the encoder discards some information in the original video sequence in order to represent the video in a more compact form (that is, at lower bitrate). An example of an encoding process is illustrated in FIG. 3. FIG. 3 illustrates an image to be encoded (In); a predicted representation of an image block (P'n); a prediction error signal (Dn); a reconstructed prediction error signal (D'n); a preliminary reconstructed image (I'n); a final reconstructed image (R'n); a transform (T) and inverse transform (T−1); a quantization (Q) and inverse quantization (Q−1); entropy encoding (E); a reference frame memory (RFM); inter prediction (Pinter); intra prediction (Pintra); mode selection (MS) and filtering (F). An example of a decoding process is illustrated in FIG. 4. FIG. 4 illustrates a predicted representation of an image block (P'n); a reconstructed prediction error signal (D'n); a preliminary reconstructed image (I'n); a final reconstructed image (R'n); an inverse transform (T−1); an inverse quantization (Q−1); an entropy decoding (E−1); a reference frame memory (RFM); a prediction (either inter or intra) (P); and filtering (F).

In accordance with an embodiment, all color samples and depth samples are rendered and, for example, if 1024×1024 amount of color samples and depth samples are provided, it would mean that one million (1M) points or two million (2M) triangles (1 quad comprises 2 triangles) would be rendered. This may lead to rendering unnecessary color samples and depth samples as it may not be known which parts of the image should be rendered and which part needed not to be rendered. Empty parts could be checked per frame basis after the decoding but this might require evaluating 1M depth samples in real-time and generating associated rendering commands In the following, an embodiment will be described in more detail in which an extra metadata stream is provided and only the visible parts of the image will be rendered.

Figure 7:
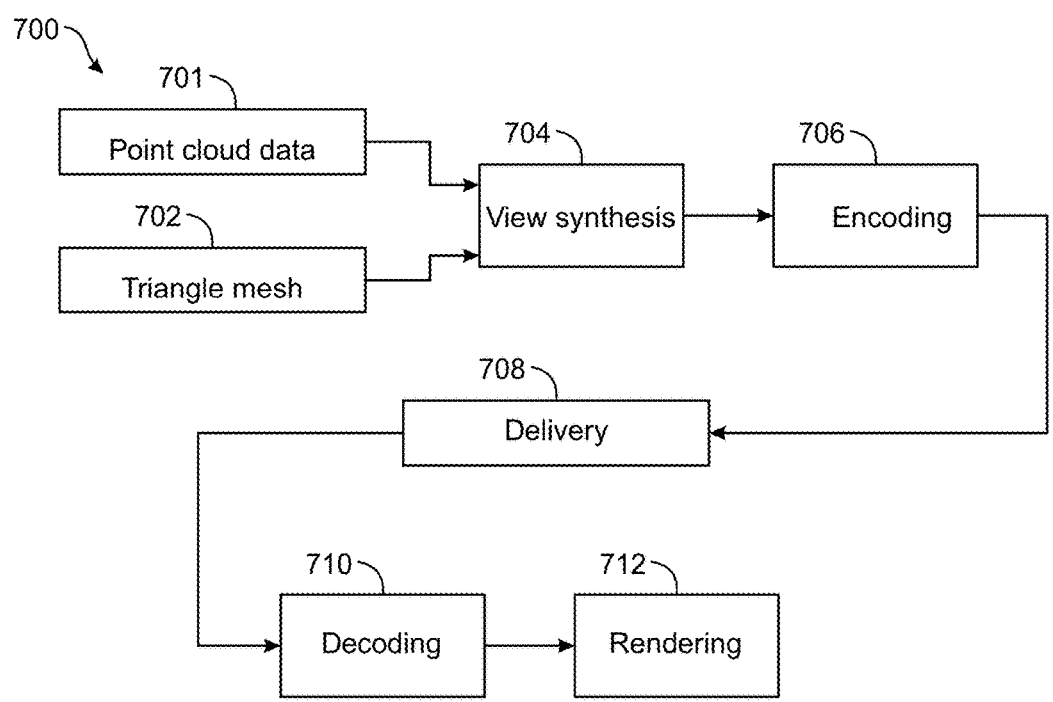
FIG. 7 illustrates an overall pipeline how to deliver volumetric content via video streams comprising depth information and color information, in accordance with an embodiment.

FIG. 7 illustrates an overall pipeline 700 how to deliver volumetric content via video streams comprising depth information and color information (depth+color streams). A first part of the pipeline takes input data for a view synthesis 704. Input data can be dense point cloud data 701 or dense triangle mesh 702. Dense point clouds can be captured with depth+color cameras or just with multiple color cameras and creating point clouds via photogrammetry technics or other techniques. This allows real-life characters to be captured. Similarly input data can be artists generated synthetic data, for example character from an animated movie. Point clouds can have millions of points per frame and also synthetic content can be million triangles with complex surface shaders. It may not be feasible to playback these kinds of content in real-time on mobile devices. Therefore, a conversion of these formats to some other format may be performed. A color+depth format can be used to represent these formats with high detail.

Figure 6A:
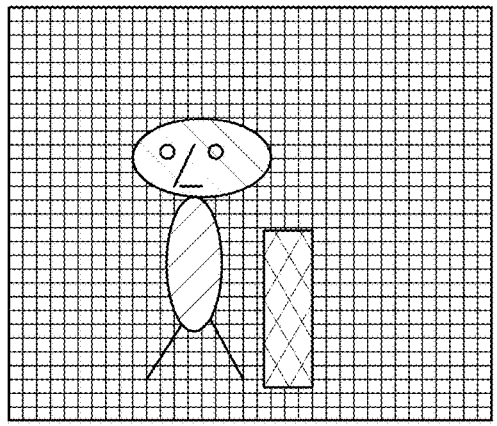
FIGS. 6a and 6b illustrate an example how to capture a character with just two views.
Figure 6B:
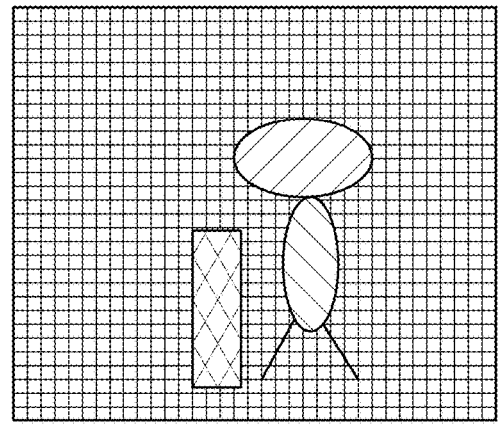

It's not possible to capture a full character from a single point of view and therefore multiple views are needed to fully capture a character. FIGS. 6a and 6b illustrate a simple example how to capture a character with just two views. One view is captured from front of the character 600 (FIG. 6a) and the other view is captured from backside of the character 600 (FIG. 6b) with orthographic projection. Two views allow to capture most of the character in detail. However, some parts of the character, like the sides in the example of FIGS. 6a and 6b, would not be fully captured. Two views are just used as an example in this specification, but multiple views (more than two views) with different sizes with different projections (orthographics, projected, spherical, etc.) could be used in practice. The synthesis 704 may produce an optimal depth range (min/max) for each view. In other words, the synthesis 704 produces information of a maximum depth and a minimum depth which appear in the scene. A range can be measured on the basis of the maximum and minimum depth. In accordance with an embodiment, the range is measured for a certain sequence of video frames, for example from one I-frame to a succeeding I-frame, wherein the range as well as the maximum and minimum depth remain the same throughout the sequence.

Once the input data is synthesized to color+depth views, video encoding 706 may be performed to compress the views. Compressed views and metadata may be stored and/or delivered 708 to a rendering device for decoding 710 and rendering 710.

In accordance with an embodiment, each video frame of the sequence may be divided into blocks. The size of the blocks is, for example, 16×16 pixels i.e. 256 pixels within one block. This is only one example of the block size but also other block sizes may be used. For each block it is determined whether the block is empty, full or partially full. This determination is based on the depth values of pixels within the block. If depth values for each pixel in the block are equal to a maximum depth value, then it is concluded that the block is empty and depth samples for pixels of that block need not be rendered. On the other hand, if depth values for each pixel in the block is less than the maximum depth value, then it is concluded that the block is full. Yet another option is that one or more of the pixels have depth values less than the maximum depth value and the rest of the pixels have depth value equal to the maximum depth value. In this case it is concluded that the block is partially full and it can be considered to be a depth edge block where depth edge is visible.

Figure 8:
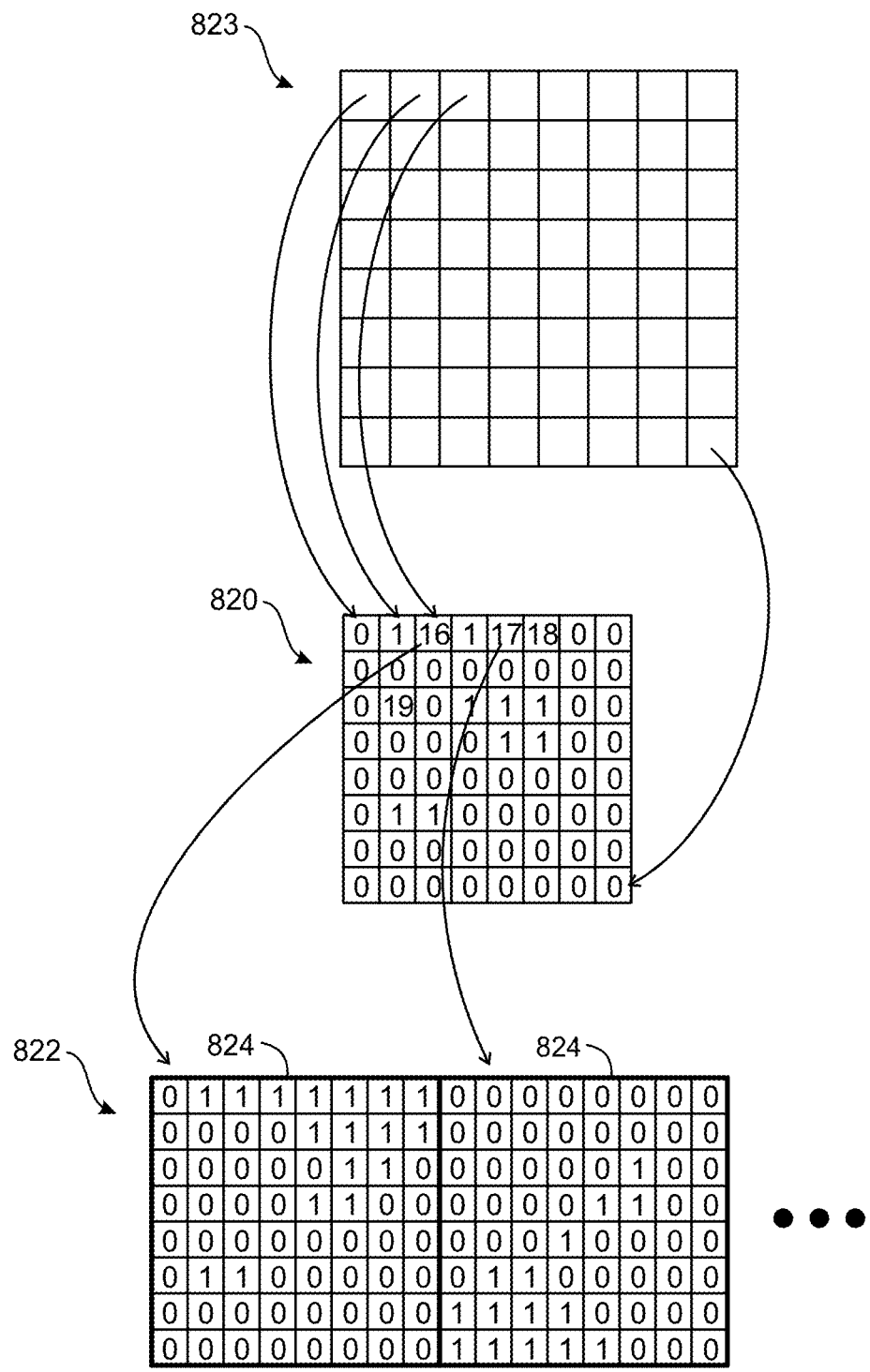
FIG. 8 depicts an example of a block offset table and a block mask buffer, in accordance with an embodiment.

In accordance with an embodiment, certain data tables are formed to indicate a status of a block. i.e. empty, full, partially full and perhaps some other status value such as edge, full edge, full flat, etc. For this purpose, a block offset table 820 is provided. Additionally, a block mask 824 is formed for blocks which are partially full. The block mask is used to indicate whether a value of a pixel in the block is the maximum depth value or not. FIG. 8 depicts an example of the block offset table 820 and the block mask buffer 822. In this example it is assumed that a frame is divided to 8×8 blocks but in practical implementations the number of blocks may differ from that. For example, the size may be 64×64 blocks/frame. It is also assumed that in this embodiment an empty block is marked with the value 0, a full block is marked with the value 1, and partially full blocks are marked with an index to a block mask 824 in a block mask buffer 822 as will be described next.

The block mask buffer 822 has a storage place for each block mask 824 which are needed to store depth information of the partially full blocks of a sequence of frames. Each block mask 824 has an indicator for each pixel within the partially full block so that each indicator reveals whether the depth value of the corresponding pixel in the block is the maximum depth value or less than the maximum depth value. This can be indicated with one bit, wherein if the block size is 16×16 bits, also the size of the block mask is 256 bits arranged e.g. in 16 pieces of 16-bit words. In accordance with an embodiment, the indicator has the value 0, if the depth value of the corresponding pixel in the block is the maximum depth value, otherwise the indicator has the value 1, or vice versa. The indicator may also be called as a mask value in this specification.

The block mask buffer 822 may be valid for a sequence of frames of one groups of pixels i.e. from an I-frame to a frame preceding the next I-frame, but also other alternatives are possible, e.g. the block mask buffer 822 may be valid for one frame only.

Figure 9A:
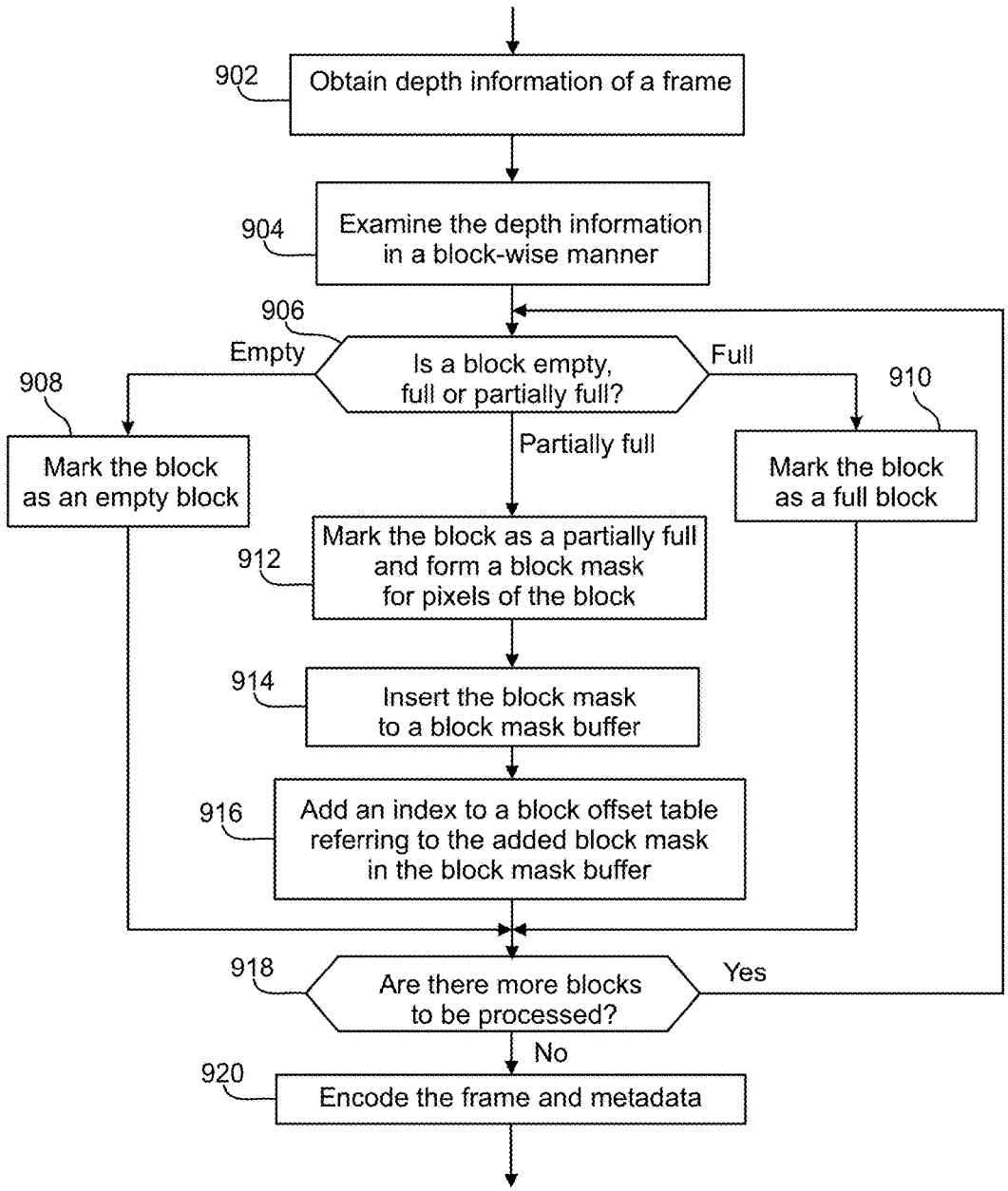
FIG. 9a is a flowchart of an encoding method according to an embodiment.

In the following, the usage of the block offset table 820 and the block mask buffer 822 will be explained with reference to the example embodiment of FIG. 8 and the flow diagram of FIG. 9a. It is assumed that depth information of an I-frame is received for the view synthesis 704 (block 902 in FIG. 9a). The I-frame is illustrated with 823 in FIG. 8. The depth information is examined 904 in a block-wise manner, for example as 8×8 blocks. The examination of the blocks may be performed in a certain order, for example from left to right and from top to bottom, but also other ordering may be used. Depth value data of pixels of a current block 823 are examined 906 to determine whether the current block 823 is an empty block, a full block or a partially full block. This may be performed so that depth values of each pixel in the current block 823 are compared with the maximum depth value and if the value is equal to the maximum depth value, the next pixel in the current block is compared with the maximum depth value. This comparison procedure may be repeated until a depth value is found which is not equal to the maximum depth value, or until depth value of each pixel in the current block has been examined. Then, if all depth values were equal to the maximum depth value, the block is marked empty and a first value is stored 908 in the element in the block offset table 820 which corresponds with the current block. On the other hand, if all depth values were different from the maximum depth value, the block is marked full and a second value is stored in the element in the block offset table 820 which corresponds with the current block. Otherwise the block is marked 912 partially full, a block mask 824 is formed 914 for the current block and an index to the block mask buffer 822 is stored 916 in the element in the block offset table 820 which corresponds with the current block. The above procedure (phases 904 to 916) may be repeated 918 until all blocks in the frame have been processed after which an encoding 920 may be performed.

The index may depend on how the block mask buffer 822 is organized. In accordance with an embodiment, the block mask buffer 822 is added with a block mask 824 when the current block is classified as a partially full block. In accordance with another embodiment, the block mask buffer 822 has a fixed length and there is a block mask 824 for each block of the frame although some of the block masks may not be needed for each frame. The latter option may require more memory storage than the previous option if not all blocks of the frame are partially full.

Bits of the block mask 824 of the block which has been classified partially full will be set for example as follows. Those bits of the block mask 824 which are empty will be set to a first mask value and the other bits will be set to a second mask value. The first mask value is, for example, 0 and the second mask value is 1, or vice versa.

FIG. 8 illustrates a situation in which a first block at the top-left corner and some other blocks have been found empty and marked with 0, the second, fourth and some other blocks are found to be full and marked with 1, and the third and fifth block have been found partially full and thus they are marked with an index to the block mask buffer 822. FIG. 8 also shows examples of block masks 824 for these two partially full blocks.

Indices in the block offset table 820 may be arranged so that an index which refers to the first block mask data in the block mask buffer 822 may have a certain value, such as 2, 16 or some other value. The index has to differ from the reserved index values used to indicate an empty block and a full block. In this example, those values are 0 and 1, respectively, so the index is at least 2. However, some other types of blocks may also be indicated with the index value, wherein the actual index to the block mask buffer should not contain such reserved values. As an example, the reserved values may indicate, not only empty and full blocks but also full edge and full flat. In the example of FIG. 8 the first value which is not reserved for special purposes, is 16. Therefore, in the example of FIG. 8 the first partially full block is indicated with the value 16 in the block offset table 820, the second partially full block is indicated with the value 17, etc.

The depth value may be represented with a predetermined number of bits. For example, if 8-bit depth values are used, then the value 255 can be used for the max value. Any other depth ranges are also possible based on whatever is supported by the video codec like 10, 12 or 16-bits.

In accordance with an embodiment, encoding one 1024× 1024 pixel view (color+depth) means that there are 4096 (1024/16×1024/16) blocks in one frame of video animation. Hence, the block offset table 820 has 4096 elements which is stored as an extra video metadata for a video frame. The block masks 824 in the block mask buffer 822 is also stored as extra video metadata but it may be shared for all views and shared across video frames.

In accordance with an embodiment, for each partially full block it is checked from the block mask buffer 822 that does it already include similar block mask 824 or not. If similar block mask 824 is found from the block mask buffer 822, the offset value of the similar block mask 824 is stored to the block offset table 820. If similar block mask 824 is not found, then block data of the current block is added to the block mask buffer 822 as a new block mask 824.

Now as we have full depth mask for the frame encoded it's possible to modify the values of depth+color samples that has max depth value.

Figure 10:
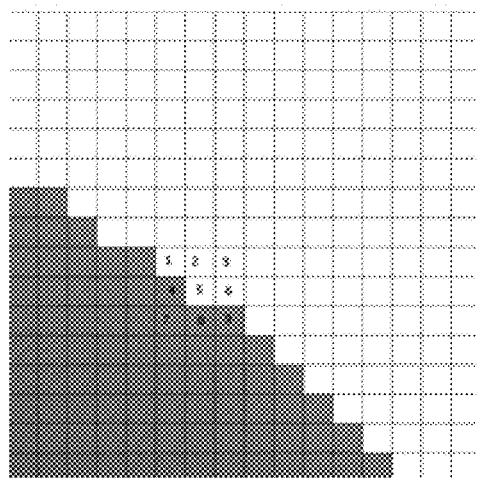
FIG. 10 illustrates an example of a partially full block.

FIG. 10 illustrates an example of a partially full block. For example, taking 3×3 depth samples illustrated with numbers 1 . . . 9 in FIG. 10, samples 4, 7, 8 and 9 include valid depth samples and samples 1, 2, 3, 5, 6 are depth max values. An idea is to do dilation image processing operation for the block where depth max values are filled by the values of neighbor valid depth values. For example, a new value for the depth sample 5 could be an average of values 4, 7, 8 and 9. By repeating this operation for all the depth max samples the depth edge would move towards the max value area. New depth values can gradually fade to the max depth value. This allows a rough depth edge to smooth out into the max depth values and video compression will work better for this kind of content. Similar operation can be applied for the color values based on the depth mask.

Once empty, full and partially full block types are discovered they can modify video compression level (quantization). Partially full blocks should be encoded with better quality whereas empty and full blocks can be encoded with more compression.

In accordance with an embodiment, areas where there are empty blocks, can be used for packing the texture atlas more compactly, because the values of color+depth for the empty blocks need not be considered. For example, if there is an area in the view that is active at all times during animation, for example a left hand moves in the animation but a right hand does not, then some views can be put on top and bottom of the right hand.

In accordance with an embodiment, encoding can detect areas which are substantially flat which means that the depth is relatively not changing much inside a block. This kind of detection can be done by finding a plane that represents the block in 3D space and then checking how much each depth value differs from this plane. Similarly, depth derivatives inside a block can be checked to see if a block is flat or not. This information, whether a block is flat or not, can be encoded to metadata per each block.

In accordance with an embodiment, both the block offset table 820 and the block masks 824 can be compressed, for example, as LZ77 or similar lossless compression methods inside the extra metadata stream.

Compressed color+depth and generated block offset table 820 and the block masks 824 can be packed, for example, inside a single .mp4 or .mp5 container for local offline file or streaming video consumption. Extra metadata could also be delivered as separate compressed files.

Figure 9B:
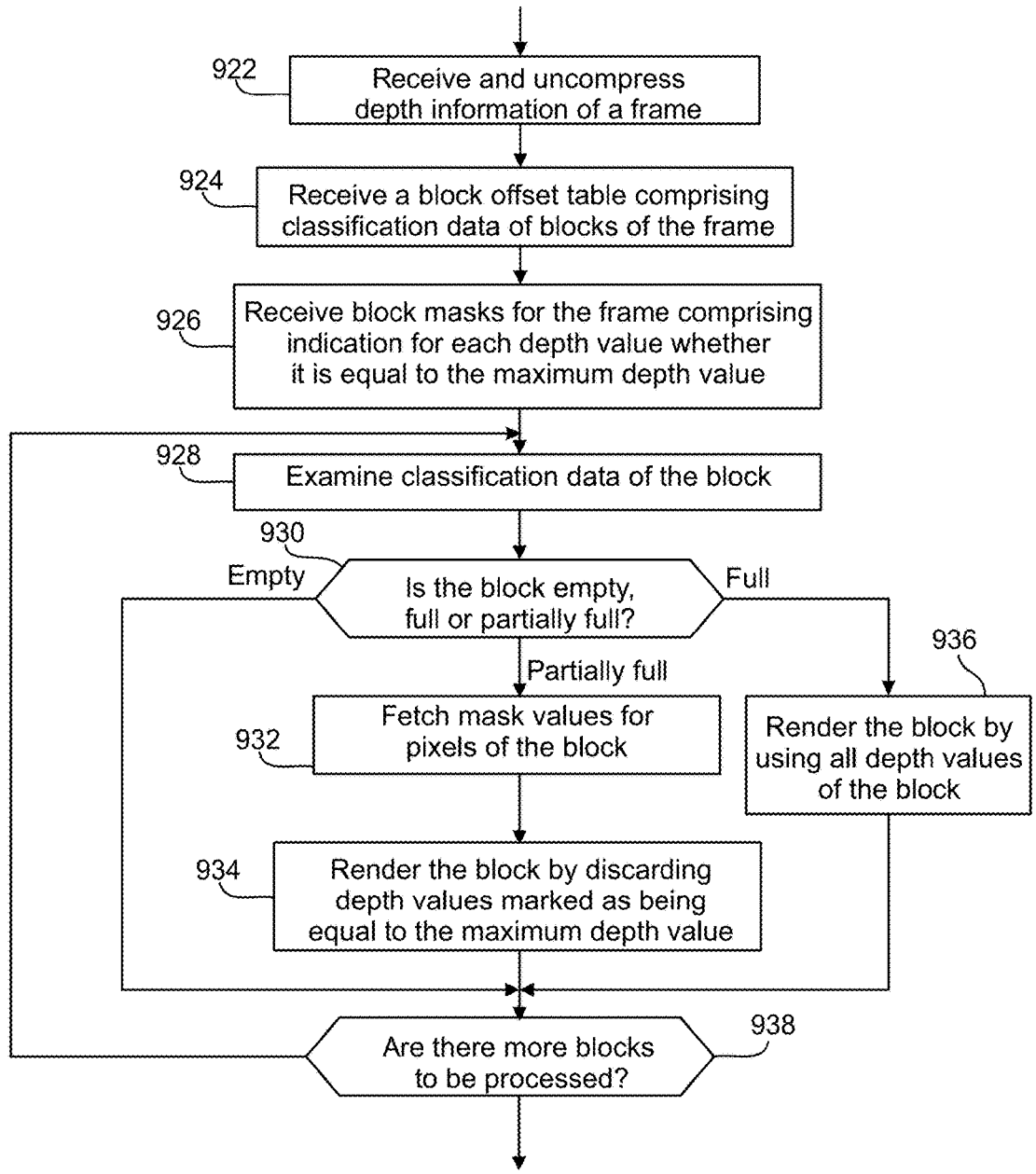
FIG. 9b is a flowchart of a rendering method according to an embodiment.

In the following, an example of a decoding procedure is described in more detail with reference to the flow diagram of FIG. 9b. Color and depth video frames will be normally received and uncompressed (block 922 in FIG. 9b). Additionally, a metadata track is also received 924, 926 and uncompressed. The metadata track comprises the block offset table 820 and the block masks 824. After or during uncompressing the block offset table 820 and the block masks 824, they may be stored to a memory of the decoding apparatus where a rendering element may fetch them for rendering received color and depth video frames.

For the rendering two rendering lists are used: one for rendering partially full blocks and one for rendering full blocks. These rendering lists are per view as each view can have different rendering parameters (projection type, depth min/max values etc.). Rendering lists are generated from the block offset table 820 by finding values which indicate that a block is a full block and values which indicate that a block is a partially full block (blocks 926, 928 and 930). In the latter case, an offset value to the block masks 824 is fetched from the block offset table 820 (block 932).

Figure 11:
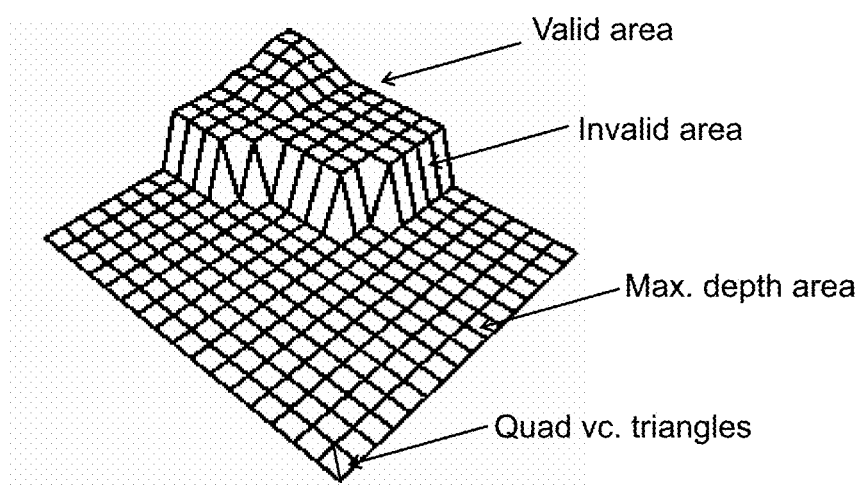
FIG. 11 illustrates an example of a mesh that would be rendered for each block where one quad is expressed as two triangles.

Rendering full blocks is straight forward (block 936). Rendering can be made by rendering points where each depth+color sample is rendered as a point. Points may be scaled based on the distance to the viewer. Near the content points will be rendered bigger in order to avoid holes during the rendering. Rendering can also be done using triangle strips. Block of 16×16 elements of depth+color data can be expressed as a triangle mesh. FIG. 11 illustrates a mesh that would be rendered for each block where one quad is expressed as two triangles. Triangles form a triangle strip and separate strips can be connected via degenerated triangles. Rendering uses instanced drawing call (for example glDrawArraysInstanced in OpenGL ES 3.X) and takes block mask data and block offset tables as a Shader Storage Buffer Objects. Vertex shader fetches values from the block offset tables and block masks and generates 3D mesh with X, Y, Z positions on the fly.

In rendering partially full blocks (blocks 932 and 934 in FIG. 9b) there is a special case where all the quads (2 triangles) that have max depth value should be discarded and this can be done by detecting these triangles in a vertex shader and then in the pixel shader discarding pixels that belong to these triangles. Similarly, quads which include some max depth values should be discarded in similar way. These triangles are marked with "invalid area" in FIG. 11.

The above procedure may be repeated 938 for each block of the frame and for each frame of the volumetric video.

In accordance with an embodiment, block flatness metadata can be used to render blocks that are flat with less triangles. For example, 8×8 quads may be rendered instead of 16×16 quads. Separate drawing command should be used to render these. In the border extra triangles should be generated in order to avoid holes between 8×8 area vs. 16×16 area.

An apparatus according to an embodiment comprises means for implementing the method. These means may comprise a computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

The various embodiments may provide some advantages. In addition to the advantages being disclosed in previous, sharp and correct depth edges may be achieved thus providing high quality rendering. Better color+depth compression may be achieved as more errors are tolerated. Decoding of the content may require less processing workload from a processor because rendering commands may be more optimal for the content. Rendering performance may also be improved as only valid content is rendered. Some embodiments also allow better usage of "empty areas" as texture atlas layout can be more compact. Some embodiments may further enable mobile devices to render more complex animated movie level characters.

If desired, the different functions discussed above may be performed in a different order and/or concurrently with other. Furthermore, if desired, one or more of the above-described functions and embodiments may be optional or may be combined.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
   obtaining depth information of a frame of a volumetric video;
   examining the depth information in a block-wise manner, wherein each block comprises two or more depth values;
   providing a classification indication of a block in a block offset table, wherein said classification indication being a partially full block, if the examination reveals that at least one depth value of the block is different from a maximum depth value, and at least one other depth value of the block is equal to the maximum depth value;
   forming a block mask for the partially full block;
   providing a mask value in the block mask for each depth value of the block, wherein said mask value indicating whether the depth value is equal to the maximum depth value or different from the maximum depth value; and
   providing an index to the block mask in the block offset table.

2. The method according to claim 1, wherein said classification indication is:
   an empty block, if the examination reveals that all depth values of the block are equal to the maximum depth value;
   a full block, if the examination reveals that all depth values of the block are different from the maximum depth value.

3. The method according to claim 2 further comprising:
   providing an empty block indication in the block offset table for the block, if the block is classified as an empty block;
   providing a full block indication in the block offset table for the block, if the block is classified as a full block.

4. The method according to claim 2 further comprising:
   encoding partially full blocks with better quality than empty blocks and full blocks.

5. The method according to claim 1, wherein forming of the block mask comprises:
   checking from previously formed block masks whether a similar block mask already exists; and
   providing the index of the previously formed similar block mask to the block, if the similar block mask already exists.

6. The method according to claim 1 further comprising:
encoding the block offset table and the block mask into a bitstream.

7. The method according to claim 1, wherein the volumetric video comprises a sequence of frames, and wherein the block offset table and the block mask remain the same for the sequence of frames.

8. The method according to claim 7, wherein the sequence of frames starts with an I-frame and ends with a frame preceding a following I-frame of the volumetric video.

9. The method according to claim 1 further comprising:
using areas classified as empty blocks for packing texture information of another part of the frame.

10. The method according to claim 1, wherein the volumetric video comprises at least one of a dense point cloud data or a dense triangle mesh.

11. An apparatus comprising at least one processor and at least one memory, said at least one memory stored with code thereon, which when executed by said at least one processor, causes the apparatus to perform at least:
obtain depth information of a frame of a volumetric video;
examine the depth information in a block-wise manner, wherein each block comprises two or more depth values;
provide a classification indication of a block in a block offset table, wherein said classification indication being a partially full block, if the examination reveals that at least one depth value of the block is different from a maximum depth value, and at least one other depth value of the block is equal to the maximum depth value;
form a block mask for the partially full block;
provide a mask value in the block mask for each depth value of the block, wherein said mask value indicating whether the depth value is equal to the maximum depth value or different from the maximum depth value; and
provide an index to the block mask in the block offset table.

12. The apparatus according to claim 11, wherein said classification indication is:
an empty block, if the examination reveals that all depth values of the block are equal to the maximum depth value;
a full block, if the examination reveals that all depth values of the block are different from the maximum depth value.

13. The apparatus according to claim 12, said at least one memory stored with code thereon, which when executed by said at least one processor, causes the apparatus to:
provide an empty block indication in the block offset table for the block, if the block is classified as an empty block;
provide a full block indication in the block offset table for the block, if the block is classified as a full block.

14. The apparatus according to claim 12, said at least one memory stored with code thereon, which when executed by said at least one processor, further causes the apparatus to:
encode partially full blocks with better quality than empty blocks and full blocks.

15. The apparatus according to claim 11, said at least one memory stored with code thereon, which when executed by said at least one processor, to form the block mask, further causes the apparatus to:
check from previously formed block masks whether a similar block mask already exists, and if so, providing the index of the previously formed similar block mask to the block.

16. The apparatus according to claim 11, said at least one memory stored with code thereon, which when executed by said at least one processor, further causes the apparatus to:
encode the block offset table and the block mask into a bitstream.

17. The apparatus according to claim 11, wherein the volumetric video comprises a sequence of frames, and wherein the block offset table and the block mask remain the same for the sequence of frames.

18. The apparatus according to claim 17, wherein the sequence of frames starts with an I-frame and ends with a frame preceding a following I-frame of the volumetric video.

19. The apparatus according to claim 11, said at least one memory stored with code thereon, which when executed by said at least one processor, further causes the apparatus to:
use areas classified as empty blocks for packing texture information of another part of the frame.

20. The apparatus according to claim 11, wherein the volumetric video comprises at least one of a dense point cloud data or a dense triangle mesh.

21. A computer readable storage medium comprising code for use by an apparatus, which when executed by a processor, causes the apparatus to perform at least:
obtain depth information of a frame of a volumetric video;
examine the depth information in a block-wise manner, wherein each block comprises two or more depth values;
provide a classification indication of a block in a block offset table, wherein said classification indication being a partially full block, if the examination reveals that at least one depth value of the block is different from a maximum depth value, and at least one other depth value of the block is equal to the maximum depth value;
form a block mask for the partially full block;
provide a mask value in the block mask for each depth value of the block, wherein said mask value indicating whether the depth value is equal to the maximum depth value or different from the maximum depth value; and
provide an index to the block mask in the block offset table.

22. A method comprising:
receiving depth information of a frame of a volumetric video;
receiving a block offset table comprising classification indication of blocks of the frame of the volumetric video;
receiving block masks for partially full blocks, wherein said block masks comprising a mask value for each depth value of the block, and wherein said mask value indicating whether the depth value is equal to the maximum depth value or different from the maximum depth value;
examining the classification indication to determine whether a block is classified as a partially full block, wherein at least one depth value of the block is different from a maximum depth value and at least one other depth value of the block is equal to the maximum depth value;
if the examination reveals that the block has been classified as a partially full block, fetching mask values for the block from the block mask indicated by the index; and
using the fetched mask values in rendering the block.

23. The method according to claim 22 further comprising:
determining on the basis of the classification indication that a block is classified as an empty block;

examining, if the block classified as an empty block has been used for encoding another block of the frame; and decoding the other block from contents of the block classified as an empty block, if the block classified as an empty block has been used for encoding another block of the frame.

24. An apparatus comprising at least one processor and at least one memory, said at least one memory stored with code thereon, which when executed by said at least one processor, causes the apparatus to perform at least:

receive depth information of a frame of volumetric video;

receive a block offset table comprising classification indication of blocks of the frame of the volumetric video;

receive block masks for partially full blocks, wherein said block masks comprising a mask value for each depth value of the block, and wherein said mask value indicating whether the depth value is equal to the maximum depth value or different from the maximum depth value;

examine the classification indication to determine whether a block is classified as a partially full block, wherein at least one depth value of the block is different from a maximum depth value and at least one other depth value of the block is equal to the maximum depth value;

fetch mask values for the block from the block mask indicated by the index, if the examination reveals that the block has been classified as a partially full block; and use the fetched mask values in rendering the block.

25. The apparatus according to claim 24, said at least one memory stored with code thereon, which when executed by said at least one processor, further causes the apparatus to determine on the basis of the classification indication that a block is classified as an empty block.

26. A computer readable storage medium comprising code for use by an apparatus, which when executed by a processor, causes the apparatus to perform at least:

receive depth information of a frame of volumetric video;

receive a block offset table comprising classification indication of blocks of the frame of the volumetric video;

receive block masks for partially full blocks, wherein said block masks comprising a mask value for each depth value of the block, and wherein said mask value indicating whether the depth value is equal to the maximum depth value or different from the maximum depth value;

examine the classification indication to determine whether a block is classified as a partially full block, wherein at least one depth value of the block is different from a maximum depth value and at least one other depth value of the block is equal to the maximum depth value;

fetch mask values for the block from the block mask indicated by the index, if the examination reveals that the block has been classified as a partially full block; and use the fetched mask values in rendering the block.

* * * * *